Patented Sept. 11, 1928.

1,683,863

UNITED STATES PATENT OFFICE.

CHARLES H. CAMPBELL, OF PITTSBURGH, PENNSYLVANIA, ASSIGNOR TO AMERICAN GLUE COMPANY, OF BOSTON, MASSACHUSETTS, A CORPORATION OF MASSACHUSETTS.

RUBBER COMPOSITION.

No Drawing.    Application filed October 22, 1926.   Serial No. 143,518.

The invention relates to an improvement in rubber compositions and by "rubber" is meant either natural rubber or reclaimed rubber or a combination of both and by "reclaimed rubber" is meant the rubber obtained by the devulcanizing of vulcanized rubber or rubber compositions.

The present application is in part a continuation of my prior application Serial No. 746,883, filed October 30, 1924.

The object of my invention is to improve rubber or a rubber composition or "mix" by giving desired stiffness or toughness to the rubber thereby increasing its load-carrying property and its resistance to wear or abrasion, and this while adding to the physical working properties of the rubber composition or "mix".

Especially is it my object to improve the rubber or rubber composition under conditions where stiffness, toughness and resistance to wear or abrasion are essentially to be desired, as for example in tire treads. Glue among other articles has been used in this connection and, while glue possesses advantages, it is a fact the tear test of rubber or a rubber composition or compound containing glue is materially less than the same compound without glue. The reason for this is that owing to its large particle size glue laminates or builds up in layers in the rubber composition, and this lamination results in tearing of the rubber composition or compound, especially when subjected to rough usage. In this particular connection, it is my object to obtain in a rubber composition all the advantages that glue might give to such composition together with additional advantages and the elimination of its disadvantages.

It is a further object of my invention to provide a rubber composition which will possess a better working quality in compounding and will stand a high degree of heat in milling without softening to a point which renders it difficult to mill; to provide a rubber composition which will especially lend itself to tubing and calendering by reason of the added smoothness given the rubber composition or compound or to refining in the case of reclaimed rubber; and to provide in a rubber composition or "mix" an agent possessing no properties harmful to rubber over a long period of time.

I have found that the objects of my invention are attained if the rubber (before the usual process of milling or refining in the case of reclaims) prior to vulcanizing has mixed or compounded with it by ordinary processes certain cleavage products obtained by the hydrolytic decomposition of keratin.

The derivatives or cleavage products employed as a reinforcing agent in accordance with my invention are those obtained by the hydrolytic decomposition of keratin to the point of obtaining soluble and diffusible cleavage products but preferably short of such hydrolytic decomposition as will form amino-acids, though some may be present, and preferably also those soluble and diffusible cleavage products obtained by the hydrolytic decomposition of keratin through the influence of heat and pressure by steam.

The process as practised by me for obtaining the hydrolyzed keratin is as follows: The keratin obtained from any source is first placed in a closed digester. Hydrolytic decomposition is effected by admitting steam to the digester. Steam admitted at 100 lbs. pressure for approximately two hours has been found to be ample in connection with the keratin obtained from young animals. With the older keratin, however, it is desirable to carry on the digesting process for a longer period of time as for example even up to six hours. The process can be hastened, however, by increasing the steam pressure or superheating the steam.

While a large quantity of the keratin derivative may be obtained during the time periods above noted, yet if it is desired to convert substantially all of the keratin which may be contained in the digester, then the period of digestion may be further prolonged even up to 15 or 18 hours. When the treatment is thus prolonged and especially when keratin of a miscellaneous type is being treated in large quantities at one time, such as 15,000 to 20,000 pounds or more, it is desirable that the soluble cleavage products be removed at intervals rather than make one long digestion to prevent the first fraction of cleavage products formed from hydrolyzing through into the amino-acid group, although at times some may be present. For example, in such case steam might first be admitted to the digester at about 125 pounds pressure for about eight hours, the steam then shut off, pressure on the digester relieved and the soluble products then drawn off and digestion continued for a further period of six hours, steam again shut off, the digester relieved and the soluble products again removed. Should the steam pressure show a material drop during the first or second period of digestion or the keratin prove especially refractory, it might be necessary to repeat the digestion for a third time for a period of from four to six hours.

At the expiration of the hydrolyzing process the material drawn off is passed through any suitable filter, evaporated to a consistency of from preferably 50 to 75 per cent solids, and then reduced to dry form and pulverized as desired.

The keratin derivatives thus obtained are mixed or compounded as desired with the rubber before vulcanizing in the ordinary manner.

Having thus fully described my invention, I claim and desire to secure by Letters Patent of the United States:—

1. A rubber composition comprising rubber having compounded with it soluble and diffusible cleavage products obtained by the hydrolytic decomposition of keratin, and which cleavage products are substantially short of amino-acids.

2. A rubber composition comprising rubber having compounded with it soluble and diffusible cleavage products obtained by the hydrolytic decomposition of keratin by steam and pressure, and which cleavage products are substantially short of amino-acids.

CHARLES H. CAMPBELL.